(12) United States Patent
Miyasaka (10) Patent No.: US 9,971,235 B2
(45) Date of Patent: May 15, 2018

(54) LIGHT SOURCE DEVICE, PROJECTOR, AND METHOD OF MANUFACTURING LIGHT SOURCE DEVICE

(71) Applicant: SEIKO EPSON CORPORATION, Tokyo (JP)

(72) Inventor: Hideo Miyasaka, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days. days.

(21) Appl. No.: 15/410,387

(22) Filed: Jan. 19, 2017

(65) Prior Publication Data

US 2017/0219918 A1    Aug. 3, 2017

(30) Foreign Application Priority Data

Jan. 29, 2016 (JP) .................................. 2016-015565
Oct. 31, 2016 (JP) .................................. 2016-213776

(51) Int. Cl.
*G03B 21/16* (2006.01)
*C03C 27/04* (2006.01)
*G03B 21/00* (2006.01)
*G03B 21/20* (2006.01)

(52) U.S. Cl.
CPC .............. *G03B 21/16* (2013.01); *C03C 27/04* (2013.01); *G03B 21/005* (2013.01); *G03B 21/204* (2013.01); *G03B 21/2013* (2013.01)

(58) Field of Classification Search
CPC .... G03B 21/16; G03B 21/145; G03B 21/208; G03B 21/2013; G03B 21/2033; H04N 9/3141; H04N 9/3144; H04N 9/3161; H04N 9/3164; F21V 29/00; F21V 29/02; F21V 29/004; F21V 29/74; F21V 29/89
See application file for complete search history.

(56) References Cited

U.S. PATENT DOCUMENTS

| | | | |
|---|---|---|---|
| 2003/0076862 A1* | 4/2003 | Itoh .......................... | G11B 7/22 372/36 |
| 2005/0237739 A1* | 10/2005 | Lee ....................... | A61N 5/0613 362/241 |
| 2007/0058357 A1 | 3/2007 | Yamaguchi et al. | |
| 2010/0066979 A1* | 3/2010 | Miyazaki ............... | G03B 21/14 353/52 |

(Continued)

FOREIGN PATENT DOCUMENTS

| | | |
|---|---|---|
| JP | 2006-261292 A | 9/2006 |
| JP | 2007-081234 A | 3/2007 |

(Continued)

*Primary Examiner* — Sultan Chowdhury
(74) *Attorney, Agent, or Firm* — Oliff PLC (57) ABSTRACT

A light source device includes a substrate having a first surface, a plurality of light emitting elements disposed on the first surface side of the substrate, a bonding frame disposed on the first surface side of the substrate so as to surround the plurality of light emitting elements, and a cover disposed on an opposite side of the bonding frame to the substrate. The substrate has metal as a forming material. The cover includes a light transmissive member. The light transmissive member is opposed to the first surface of the substrate, and transmits the light emitted from the plurality of light emitting elements. The bonding frame is lower in thermal conductivity compared to the substrate.

20 Claims, 5 Drawing Sheets

(56) References Cited

U.S. PATENT DOCUMENTS

| | | | | |
|---|---|---|---|---|
| 2012/0327374 A1* | 12/2012 | Kitano | ............ | G03B 21/16 |
| | | | | 353/31 |
| 2013/0044501 A1* | 2/2013 | Rudisill | ............ | F21V 29/004 |
| | | | | 362/398 |
| 2015/0036107 A1 | 2/2015 | Nagahara et al. | | |
| 2015/0270682 A1* | 9/2015 | Daniels | ............ | H01S 5/405 |
| | | | | 353/99 |
| 2015/0309399 A1* | 10/2015 | Kim | ............ | F21V 13/14 |
| | | | | 353/33 |

FOREIGN PATENT DOCUMENTS

| | | | |
|---|---|---|---|
| JP | 2007-123411 A | 5/2007 |
| JP | 2015-045843 A | 3/2015 |
| JP | 2015-195330 A | 11/2015 |

* cited by examiner

LIGHT SOURCE DEVICE, PROJECTOR, AND METHOD OF MANUFACTURING LIGHT SOURCE DEVICE

BACKGROUND

1. Technical Field

The present invention relates to a light source device, a projector, and a method of manufacturing a light source device.

2. Related Art

A light emitting element such as a light emitting diode or a semiconductor laser used for a light source device is damaged in some cases when emitting light if an organic substance or moisture adheres to the light emitting element. Therefore, the light source device is provided with a structure of shielding the light emitting element from the outside air. In the past, as such a structure, there has been known an airtight sealing structure of bonding a substrate made of ceramics and a cover made of glass to each other to seal the light emitting element (e.g., JP-A-2007-123444 (Document 1)). In recent years, due to downsizing of the light source device, there has been studied the light source device having a structure of mounting a plurality of light emitting elements on a substrate in high density.

In general, since these light emitting elements generate heat when emitting light, there is a possibility that the light emitting elements deteriorate or the light emitting characteristics degrade due to the heat. Therefore, the light source device is configured so as to prevent the light emitting elements from becoming high in temperature by discharging the heat generated by the light emitting elements to the outside.

However, in the light source device described in Document 1, there is used the substrate made of ceramics. Although the heat generated by the light emitting element is discharged to the outside via the substrate, the substrate made of ceramics is low in thermal conductivity (heat radiation performance), and is easy to accumulate heat. Therefore, in the light source device described in Document 1, in order to prevent the light emitting elements from becoming high in temperature, it is necessary to decrease the amount of heat generation per unit area of the substrate. In order to achieve the above, it is effective to decrease the number of light emitting elements per unit area. However, in this case, since it is necessary to increase the size of the substrate for achieving the necessary light intensity, downsizing of the whole of the light source device has been difficult.

In the case of bonding the substrate and the cover to each other using a bonding member made of an inorganic substance such as low-melting point glass, it is necessary to heat the whole of the light source device to a temperature equal to or higher than the melting point of the bonding member. Therefore, in some cases, the light emitting elements deteriorate due to the heating, and the desired light emitting characteristics cannot be obtained.

SUMMARY

An advantage of some aspects of the invention is to provide a light source device which provides the desired light emitting characteristic, can be miniaturized, and is high in reliability. Another advantage of some aspects of the invention is to provide a method of manufacturing a light source device the light emitting elements of which are hard to deteriorate. Still another advantage of some aspects of the invention is to provide a projector which has the light source device, and is therefore capable of performing display with desired luminance, and is high in reliability.

An aspect of the invention provides a light source device including a substrate including metal as a forming material, and having a first surface, a plurality of light emitting elements disposed on the first surface side of the substrate, a bonding frame disposed on the first surface side of the substrate so as to surround the plurality of light emitting elements, and a cover including a light transmissive member disposed so as to be opposed to the first surface of the substrate, wherein light emitted from the plurality of light emitting elements is transmitted through the light transmissive member, and the bonding frame is lower in thermal conductivity compared to the substrate.

According to this configuration, the substrate including the metal as the forming material has a higher heat radiation performance of the substrate itself compared to the related-art substrate made of ceramics. Thus, since the distance between the two light emitting elements adjacent to each other can be made shorter than the case of using the substrate made of ceramics, the light emitting elements can be mounted on the substrate in high density. Further, since the heat generated by the light emitting elements is efficiently discharged, the reliability of the light source device is high.

Further, since the bonding frame is lower in thermal conductivity compared to the substrate, the heat generated when the cover is bonded to the bonding frame is hard to be conducted to the substrate. Thus, the deterioration of the light emitting elements due to the heat can be reduced.

Due to the effects described above, the light source device related to this aspect of the invention provides desired light emitting characteristics and high reliability, and is suitable for miniaturization.

The light source device according to the aspect of the invention may be configured such that the cover includes the light transmissive member and a support frame to which the light transmissive member is bonded, and the support frame is bonded on an opposite side of the bonding frame to the substrate.

According to this configuration, since the bonding frame is lower in thermal conductivity compared to the substrate, the heat generated when the cover is bonded to the bonding frame is hard to be conducted to the substrate. With this configuration, the deterioration of the light emitting elements due to the heat can be reduced.

The light source device according to the aspect of the invention may be configured such that the support frame is welded to the bonding frame. With this configuration, it is possible to locally heat only the bonding part between the support frame and the bonding frame. Therefore, it is possible for the light source device according to this aspect of the invention to reduce the deterioration of the light emitting elements due to the heat in the manufacturing process.

The light source device according to the aspect of the invention may be configured such that the light transmissive member is disposed on the substrate side of the support frame. In general, the light emitted from the light emitting elements is diverging light. Further, an optical element such as a collecting lens may be disposed on the light emission side of the light transmissive member. With this configuration, the distance between the light emitting elements and the light transmissive member can be made smaller. In other words, it is possible to decrease the distance between the optical element disposed on the light emission side of the light transmissive member and the light emitting elements.

Therefore, it is possible to efficiently use the light emitted from the light emitting elements.

The light source device according to the aspect of the invention may be configured such that the light source device includes a housing space surrounded by the substrate, the bonding frame, and the cover, and the housing space is in a vacuum state. With this configuration, it is possible to reduce the adhesion of an organic substance or moisture to the surface of the light emitting elements compared to the light source device having the housing space in other states than the vacuum state. Therefore, it is possible for the light source device according to the aspect of the invention to reduce the damage of the light emitting elements during use, and to have higher reliability.

The light source device according to the aspect of the invention may be configured such that the housing space is filled with an inert gas. With this configuration, it is possible to reduce the adhesion of an organic substance or moisture to the surface of the light emitting elements compared to the light source device having the housing space not filled with the inert gas. Therefore, in the light source device according to the aspect of the invention, since the damage of the light emitting elements during use is reduced, the higher reliability is achieved.

The light source device according to the aspect of the invention may be configured such that the light source device includes a housing space surrounded by the substrate, the bonding frame, and the cover, and the housing space is filled with an inert gas. With this configuration, it is possible to reduce the adhesion of an organic substance or moisture to the surface of the light emitting elements compared to the light source device having the housing space not filled with the inert gas. Therefore, in the light source device according to the aspect of the invention, since the damage of the light emitting elements during use is reduced, the higher reliability is achieved.

The light source device according to the aspect of the invention may be configured such that the light source device further includes a wavelength conversion element adapted to convert at least a part of light emitted from the plurality of light emitting elements into fluorescence. With this configuration, it is possible for the light source device related to the aspect of the invention to emit light with a desired wavelength.

Another aspect of the invention provides a method of manufacturing a light source device, the method including providing the light source device including a substrate having metal as a forming material, and having a first surface, a plurality of light emitting elements disposed on the first surface side of the substrate, a bonding frame disposed on the first surface side of the substrate so as to surround the plurality of light emitting elements, and a cover including a light transmissive member disposed so as to be opposed to the first surface of the substrate, and bonding the cover to the bonding frame with local heating, wherein the bonding frame is lower in thermal conductivity compared to the substrate.

This method involves the local heating. In addition, the bonding frame is lower in thermal conductivity compared to the substrate. Therefore, the heat generated when the cover is bonded to the bonding frame is hard to be conducted to the substrate. Thus, the deterioration of the light emitting elements due to the heat in the process of manufacturing the light source device can be reduced.

The method of manufacturing the light source device according to the aspect of the invention may be configured such that the cover includes the light transmissive member and a support frame to which the light transmissive member is bonded, and the cover is bonded to the bonding frame through welding the support frame to the bonding frame.

According to the method with this configuration, it is sufficient to heat the bonding part between the bonding frame and the support frame to a temperature at which the welding is achievable. Further, since the bonding frame is lower in thermal conductivity compared to the substrate, the heat generated when the support frame is welded to the bonding frame is hard to be conducted to the substrate. Thus, the deterioration of the light emitting elements due to the heat in the process of manufacturing the light source device can be reduced.

The method of manufacturing the light source device according to the aspect of the invention may be configured such that the bonding of the cover includes the steps of disposing low-melting point glass between the bonding frame and the light transmissive member, and melting the low-melting point glass with the local heating.

According to the method with this configuration, the bonding process can be performed at a relatively low temperature at which the low-melting point glass can be melted. Further, in addition to the local heating, the bonding frame is lower in thermal conductivity compared to the substrate, and therefore, the heat generated when the support frame is bonded to the bonding frame is hard to be conducted to the substrate. Thus, the deterioration of the light emitting elements due to the heat in the process of manufacturing the light source device can be reduced.

Another aspect of the invention provides a projector including the light source device described above, a light modulation device adapted to modulate light emitted from the light source device, in accordance with image information, and a projection optical system adapted to project the light modulated by the light modulation device. The projector according to the aspect of the invention is provided with the light source device described above, and is therefore capable of displaying the desired image, and is high in reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Some embodiments of the invention will hereinafter be described in detail with reference to the accompanying drawings.

It should be noted that the drawings used in the following description show characteristic parts in an enlarged manner in some cases in order to make the characteristics easy to understand, and the dimensional ratios between the constituents and so on are not necessarily the same as actual ones. Further, noncharacteristic parts are omitted from the illustration in some cases for the same purpose.

Light Source Device

Although an example of the light source device according to the present embodiment will hereinafter be described, the present embodiment is not limited to this example.

Figure 1:
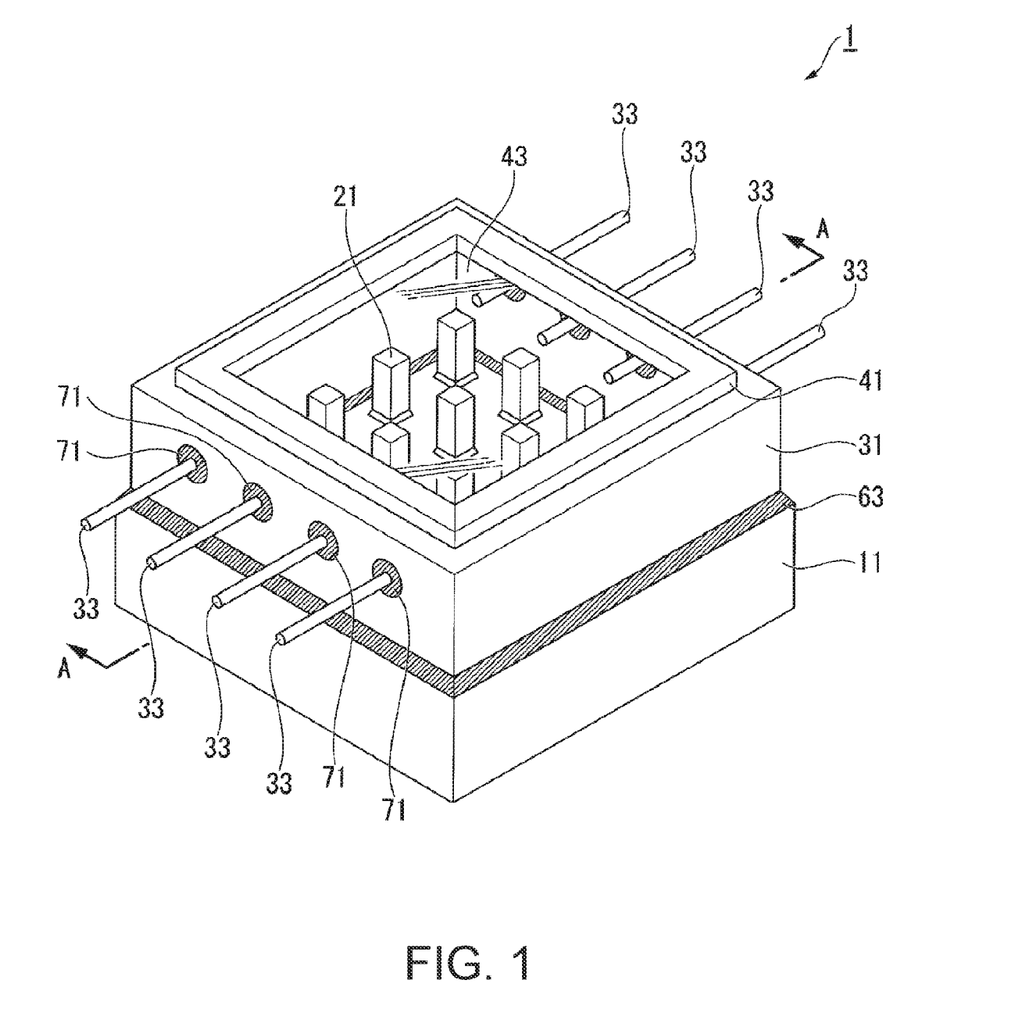
FIG. 1 is a perspective view showing a light source device 1 according to an embodiment of the invention.
Figure 2:
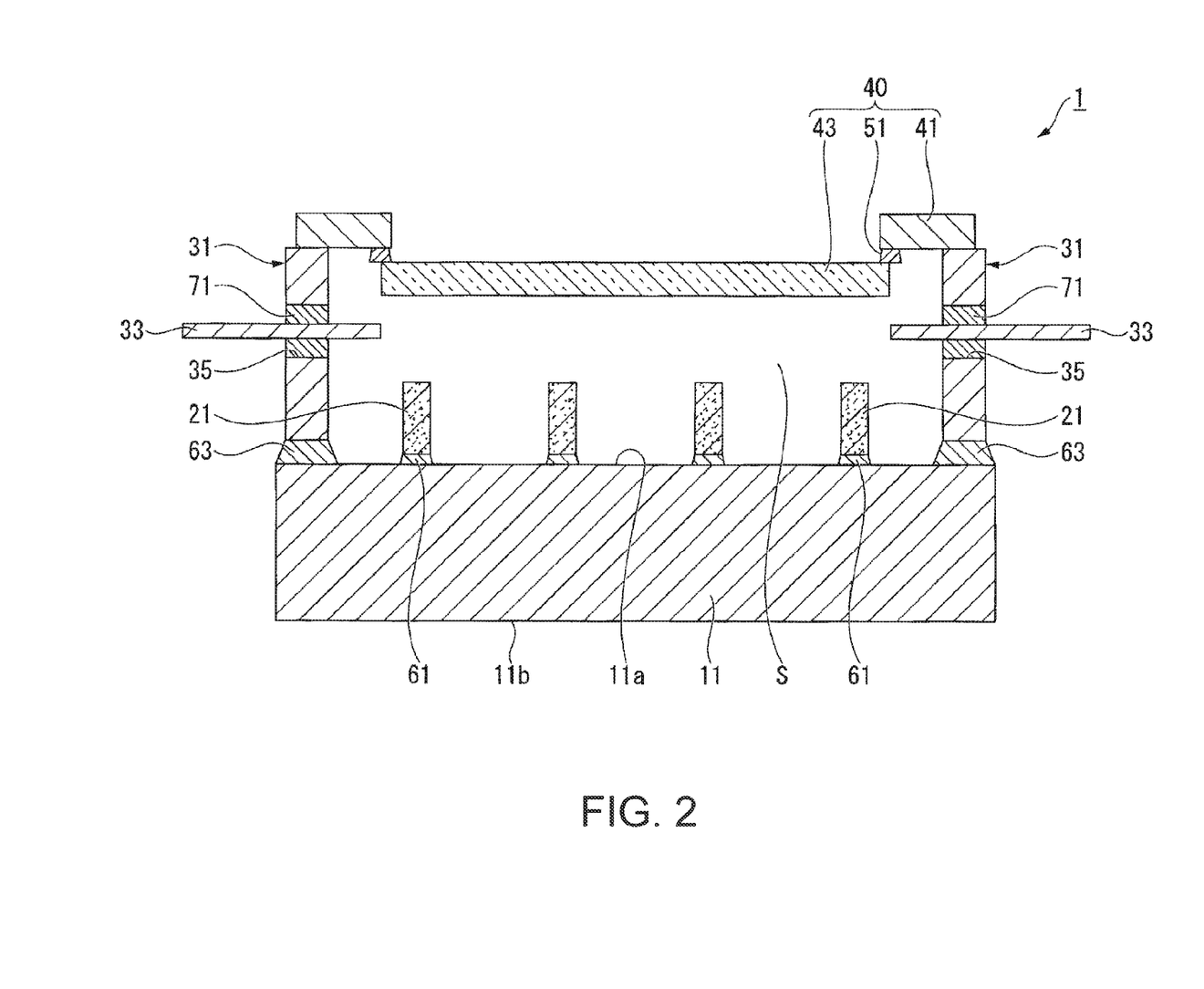
FIG. 2 is a cross-sectional view along the line A-A shown in FIG. 1.

FIG. 1 is a perspective view showing the light source device 1 according to the present embodiment. FIG. 2 is a cross-sectional view along the line A-A shown in FIG. 1. As shown in FIGS. 1 and 2, the light source device 1 according to the present embodiment is provided with a substrate 11, a plurality of light emitting elements 21, a bonding frame 31, a plurality of electrodes 33, a support frame 41, and a light transmissive member 43.

The substrate 11 has a first surface 11a, and a second surface 11b located on the opposite side and attached with, for example, a heat radiator. The light emitting elements 21 are disposed on the first surface 11a side of the substrate 11 with a bonding member 61. The light emitting elements 21 each emit light toward the opposite side to the substrate 11. As the bonding member 61, there is used a solder material such as gold-tin.

The bonding frame 31 is disposed on the first surface 11a side of the substrate 11 so as to surround the plurality of light emitting elements 21. The bonding frame 31 is bonded to the substrate 11 with a bonding member 63. The bonding member 63 is not particularly limited providing the substrate 11 and the bonding frame 31 can be bonded to each other with the bonding member 63, but brazing metal is preferable, and a silver solder is more preferably used.

Further, the bonding frame 31 is provided with a plurality of through holes 35. The through holes 35 are each provided with an electrode 33 for supplying the light emitting elements 21 with the electrical power. The electrodes 33 are each provided with bonding wires to electrically be connected to the light emitting elements 21 (not shown). A gap between the bonding frame 31 and each of the electrodes 33 is sealed with a sealing member 71. As the sealing member 71, low-melting point glass, for example, is preferably used.

The support frame 41 is bonded to the opposite side of the bonding frame 31 to the substrate 11.

The light transmissive member 43 is disposed on the substrate side of the support frame 41 so as to be opposed to the first surface 11a. On this occasion, the light transmissive member 43 is bonded to the support frame 41 with an adhesive member 51. As the adhesive member 51, low-melting point glass, for example, is preferably used. In the present embodiment, the light transmissive member 43 constitutes a cover 40 together with the support frame 41 and the adhesive member 51.

The light source device 1 has a housing space S surrounded by the substrate 11, the bonding frame 31, the support frame 41, and the light transmissive member 43. Therefore, the plurality of light emitting elements 21 is disposed in the housing space S.

Substrate

Hereinafter, configurations of the respective constituents will be described in detail based on FIG. 2.

The substrate 11 has a quadrangular shape such as a roughly square shape or a roughly rectangular shape in a planar view. The first surface 11a for mounting the light emitting elements 21 is, for example, a flat surface.

As a forming material of the substrate 11, there is used a material high in heat radiation performance such as a metal material. As such a metal material, copper or aluminum is preferable, and copper is more preferably used.

Light Emitting Element

As the light emitting elements 21, there are used, for example, light emitting diodes or semiconductor lasers. As the light emitting elements 21, there can be selected those with arbitrary wavelengths in accordance with the intended use. For example, as the light emitting elements for blue light with the wavelength of 430 nm through 490 nm, there can be included nitride-type semiconductors ($In_XAl_YGa_{1-X-Y}N$, $0 \leq X \leq$, $0Y \leq 1$, $X+Y \leq 1$). Further, in addition to the above, it is also possible to include a material partially substituted by a boron atom as a group-III element, or a material obtained by substituting phosphorus atoms or arsenic atoms for some of the nitrogen atoms as a group-V element.

Bonding Frame, Electrode

As a forming material of the bonding frame 31, there is used a material lower in thermal conductivity compared to the substrate 11. As such a material, there is used Kovar, for example. On the surface of the bonding frame 31, there is formed a plated layer made of, for example, nickel-gold.

As a material of the electrodes 33, there is used Kovar, for example. Further, on the surface of each of the electrodes 33, there is formed a plated layer made of, for example, nickel-gold.

In the housing space S, the bonding wires are disposed in the end parts of the electrodes 33, and the electrodes 33 are electrically connected to the light emitting elements 21 (not shown). As the forming material of the bonding wires, gold is preferably used. The other end part of each of the electrodes 33 is connected to an external electric circuit (not shown).

Support Frame

As a forming material of the support frame 41, there can be cited, for example, metal, and copper is preferably used. On the surface of the support frame 41, there is formed a plated layer made of, for example, nickel.

The support frame 41 is welded to the bonding frame 31 using, for example, nickel-gold.

Light Transmissive Member

The light transmissive member 43 is not particularly limited as long as the light transmissive member 43 is capable of transmitting the light emitted from the light emitting elements 21. As the forming material of the light transmissive member 43, there can be cited glass such as borosilicate glass, quartz glass, or quart glass, quartz crystal, sapphire, and so on.

It is also possible for the light transmissive member 43 to have an optical element (not shown) having, for example, a lens function formed integrally on the opposite side to the substrate 11. As such an optical element, there can be cited, for example, a collecting lens.

Housing Space

In the present embodiment, the housing space S is formed as an enclosed space in order to reduce adhesion of an organic substance or moisture to the surfaces of the light emitting elements 21. On this occasion, it is preferable for the housing space S to be in a vacuum state. Further, in the case in which the housing space S is not in the vacuum state, it is preferable for the housing space S to be filled with an inert gas such as a nitrogen gas. As the inert gas, it is preferable to use a gas with purity as high as industrial level. It should be noted that in the present specification, the vacuum state denotes the state of the space filled with a gas at pressure lower than the normal atmospheric pressure as provided in JIS Z 8126. In this definition, the gas can also be an inert gas.

Since the light emitting elements 21 generate heat when emitting the light, there is a possibility that the light emitting elements 21 deteriorate or the light emitting characteristics degrade due to the heat. The light source device 1 according to the present embodiment is provided with the substrate 11 using a metal material as the forming material. The heat generated by the light emitting elements is discharged to the outside via the substrate. The substrate 11 according to the present embodiment is higher in heat radiation performance of the substrate itself compared to the related-art substrate made of ceramics. Therefore, in the light source device 1, rise in temperature of the light emitting elements can be reduced without decreasing the amount of heat generation per unit area of the substrate 11. In other words, there is no need to decrease the number of the light emitting elements 21 per unit area of the substrate 11. Due to the effects described above, it is possible for the light source device 1 according to the present embodiment to mount the plurality of light emitting elements 21 on the substrate 11 in high density, and thus, it is possible to miniaturize the whole of the light source device 1.

In the present embodiment, the bonding frame 31 is lower in thermal conductivity compared to the substrate 11. Thus, it is hard for the heat generated when the support frame 41 is bonded to the bonding frame 31 to be conducted to the substrate 11, and therefore it is possible to reduce the heat conducted from the substrate 11 to the light emitting elements 21. Due to the effects described above, it is possible for the light source device 1 according to the present embodiment to reduce the deterioration of the light emitting elements 21 due to the heat.

In the present embodiment, the support frame 41 is welded to the bonding frame 31. Therefore, locally heating the bonding part between the support frame 41 and the bonding frame 31 can bond the support frame 41 to the bonding frame 31. Due to the effects described above, it is possible for the light source device 1 according to the present embodiment to reduce the deterioration of the light emitting elements 21 due to the heat in the manufacturing process.

In the present embodiment, the light transmissive member 43 is disposed on the substrate 11 side of the support frame 41. Thus, it is possible to shorten the distance between the light emitting elements 21 and the light transmissive member 43. In general, the light emitted from the light emitting elements 21 is diverging light. Therefore, the shorter the distance between the light emitting elements 21 and the light transmissive member 43 is, the more efficiently the light emitted from the light emitting elements 21 can be taken out through the light transmissive member 43. Further, it is also possible for an optical element such as a collecting lens to be disposed on the light emission side of the light transmissive member 43. According to the configuration described above, it is possible to decrease the distance between the optical element disposed on the light emission side of the light transmissive member 43 and the light emitting elements 21. Therefore, it is possible to efficiently use the light emitted from the light emitting elements 21.

It is also possible for the light transmissive member 43 to have a member having a lens function such as a collecting lens formed integrally on the opposite side to the substrate 11. Thus, it is possible to efficiently use the light transmitted through the light transmissive member 43.

In the present embodiment, it is preferable for the housing space S to be in the vacuum state or filled with an inert gas. Thus, it is possible to reduce the adhesion of an organic substance or moisture to the surfaces of the light emitting elements 21 compared to the light source device having the housing space S in other states than described above. Due to the effects described above, since the damage of the light emitting elements 21 during use is reduced, the light source device 1 according to the present embodiment is high in reliability.

According to the present embodiment, there is provided the light source device which provides the desired light emitting characteristics and high reliability, and is suitable for miniaturization Method of Manufacturing Light Source Device Although an example of a method of manufacturing the light source device according to the present embodiment will hereinafter be described, the present embodiment is not limited to this example.

Figure 3:
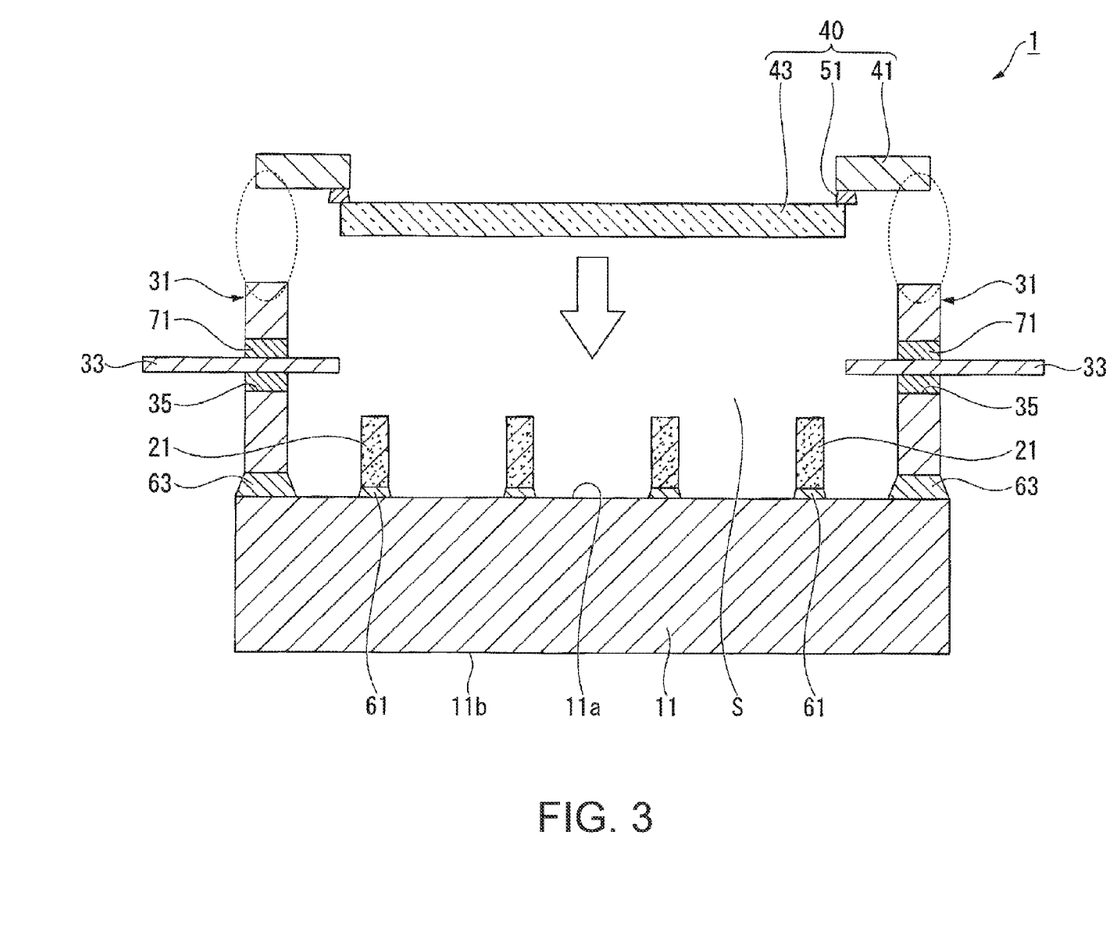
FIG. 3 is a cross-sectional view showing a method of manufacturing the light source device according to the embodiment described above.

FIG. 3 is a cross-sectional view showing the method of manufacturing the light source device according to the present embodiment. As shown in FIG. 3, firstly, the support frame 41 is fixed to the light transmissive member 43 using the adhesive member 51 to form the cover 40.

Separately from the cover 40, the bonding frame 31 provided with the through holes 35 and the light emitting elements 21 are bonded on the first surface 11a of the substrate 11. On this occasion, it is possible to bond either one of the light emitting elements 21 and the bonding frame 31 to the first surface 11a in advance. It should be noted that if bonding of the light emitting elements 21 is performed after bonding of the bonding frame 31, there is no chance for the light emitting elements 21 to receive the heat generated in bonding the bonding frame 31, and therefore, it is more preferable to perform bonding of the bonding frame 31 in advance.

Then, the electrodes 33 are fixed to the bonding frame 31 with the sealing members 71. It should be noted that the process can also be performed before bonding the bonding frame 31 to the first surface 11a.

Subsequently, the light emitting elements 21 and the electrodes 33 are electrically connected to each other with the bonding wires. Specifically, one end parts of the bonding wires are bonded to the electrodes 33, and at the same time the other end parts of the bonding wires are bonded to the light emitting elements 21.

Subsequently, the bonding frame 31 provided to the substrate 11 and the support frame 41 provided to the light transmissive member 43 are welded to each other. In the present embodiment, this process corresponds to a bonding process in the appended claims. In this bonding process, the light transmissive member 43 is disposed so as to be opposed to the first surface 11a.

Specifically, the weld can be achieved by locally heating the bonding part between the bonding frame 31 and the support frame 41 to melt the plated layer made of nickel-gold formed on the surface of the bonding frame 31. As the welding method, there is used welding by local heating such as resistance welding or laser welding.

It is preferable to perform the bonding process in vacuo. Further, it is preferable to perform the bonding process in a space filled with an inert gas such as a nitrogen gas. Thus, it is possible to reduce the adhesion of an organic substance or moisture to the surfaces of the light emitting elements 21 during the manufacturing process of the light source device 1. Further, since the housing space S can be set to the vacuum state or filled with the nitrogen gas, it is possible to reduce the adhesion of an organic substance or moisture to the surfaces of the light emitting elements 21 also during the use of the light source device 1. Therefore, it is possible to easily manufacture the light source device, in which the damage of the light emitting elements 21 during the use of the light source device 1 is reduced, and which is high in reliability.

In the method of manufacturing the light source device according to the present embodiment, since the bonding frame 31 is lower in thermal conductivity compared to the substrate 11, the heat generated when the support frame 41 is bonded to the bonding frame 31 is hard to be conducted to the substrate 11. Therefore, it is possible to suppress the ambient temperature of the light emitting element 21 to be equal to or lower than the operating temperature of the light source device 1. It should be noted that the operating temperature of the light source device 1 according to the present embodiment is in a range of 50 through 70° C.

Further, it is possible to achieve the weld by locally heating the bonding part between the bonding frame 31 and the support frame 41. Further, the weld using nickel-gold is low in welding temperature, and can therefore achieve the weld with less heating. Due to the effects described above, it is possible for the method of manufacturing the light source device according to the present embodiment to reduce the deterioration of the light emitting elements 21 due to the heat in the manufacturing process.

According to the present embodiment, there is provided a method of manufacturing the light source device capable of manufacturing the light source device which is capable of reducing the deterioration of the light emitting elements due to the heat, and is high in reliability.

Modified Examples

Figure 4:
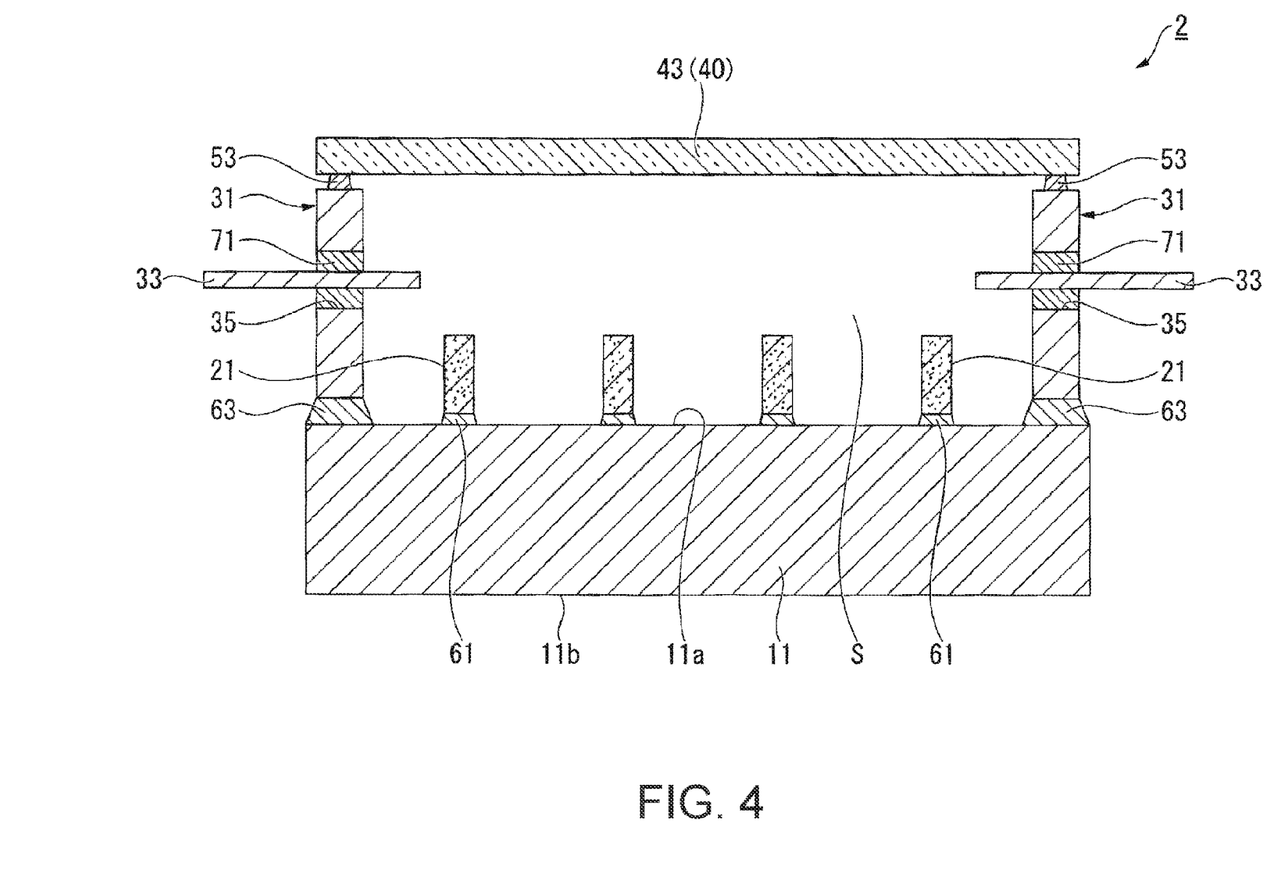
FIG. 4 is a cross-sectional view showing a light source device 2 as another configuration of the light source device according to the embodiment.

For example, in the light source device 1 according to the present embodiment, there is shown an example in which the cover 40 includes the support frame 41, but the cover 40 may not include the support frame 41. FIG. 4 is a cross-sectional view showing a light source device 2 as another configuration of the light source device according to the present embodiment. As shown in FIG. 4, in the light source device 2, the cover 40 formed of the light transmissive member 43 is bonded to the bonding frame 31 with an adhesive member 53. As the adhesive member 53, there is used low-melting point glass.

A method of manufacturing the light source device 2 is partially common to the method of manufacturing the light source device 1. The difference therebetween is the bonding process. The bonding process in the method of manufacturing the light source device 2 includes a process of disposing the bonding member 53 (the low-melting point glass) between the bonding frame 31 and the light transmissive member 43, and a process of melting the bonding member 53 by local heating. In the light source device 2, a plated layer made of nickel, which can be bonded to the low-melting point glass, is disposed on the surface of the bonding frame 31.

In the present embodiment, the bonding frame 31 is lower in thermal conductivity compared to the substrate 11. Thus, it is hard for the heat generated when the light transmissive member 43 is bonded to the bonding frame 31 to be conducted to the substrate 11, and therefore it is possible to reduce the heat conducted from the substrate 11 to the light emitting elements 21. Due to the effects described above, the deterioration of the light emitting elements 21 due to the heat can be reduced also in the light source device 2 similarly to the light source device 1.

Further, the light source device 2 is decreased in the number of the constituents, and is decreased in the number of the bonding parts, and can therefore reduce the risk of damages in the bonding parts.

Projector

Although an example of a projector according to the present embodiment will hereinafter be described, the present embodiment is not limited to this example.

Figure 5:
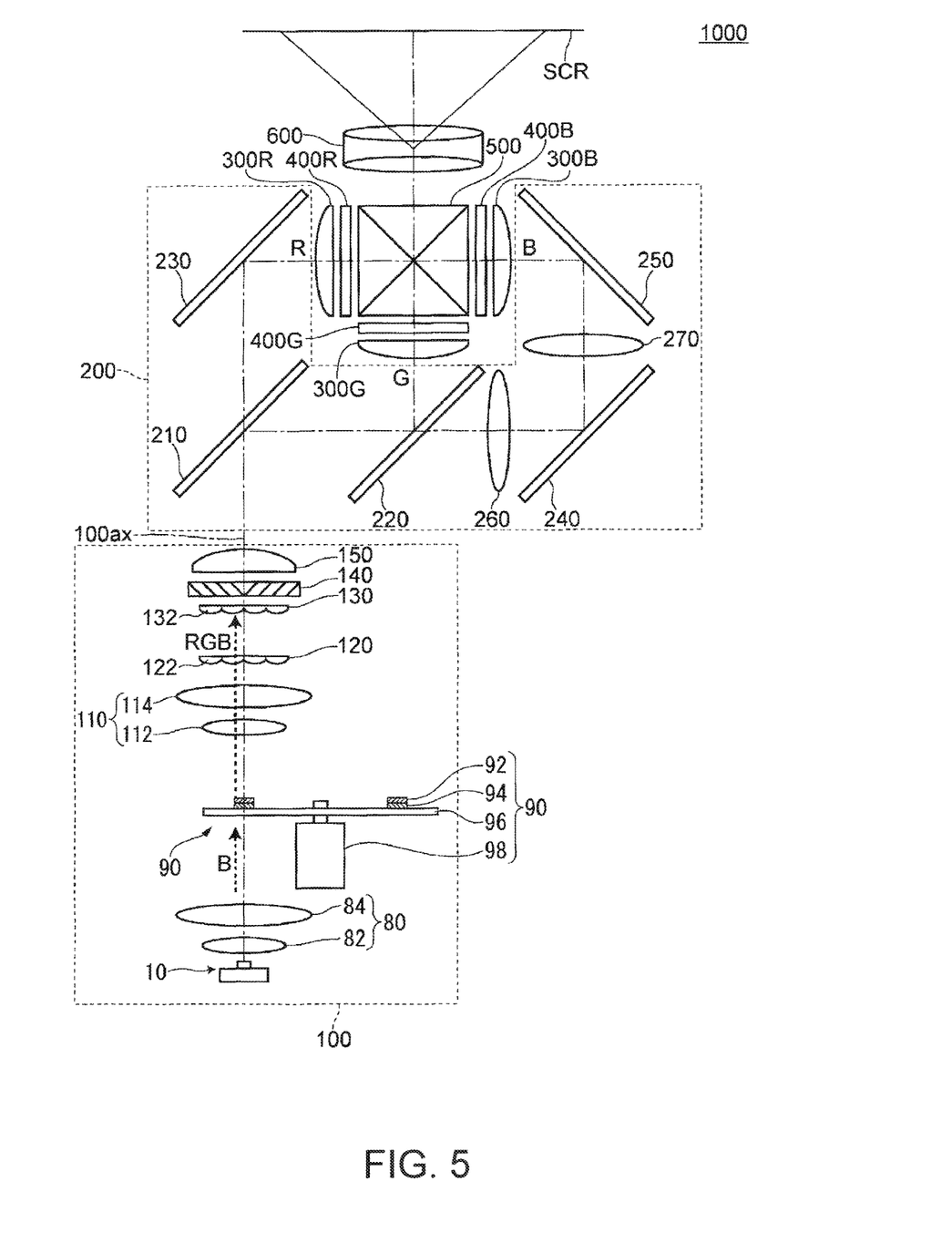
FIG. 5 is a schematic diagram showing an optical system of a projector 1000 according to the embodiment.

FIG. 5 is a schematic diagram showing an optical system of the projector 1000 according to the present embodiment. As shown in FIG. 5, the projector 1000 according to the present embodiment is provided with an illumination device 100, a color separation light guide optical system. 200, three liquid crystal light modulation devices 400R, 400G, and 400B, a cross dichroic prism 500, and a projection optical system 600.

The illumination device 100 is provided with a light source section 10, a light collection optical system 80, a wavelength conversion element 90, a collimating optical system 110, a first lens array 120, a second lens array 130, a polarization conversion element 140, and an overlapping lens 150. In the present embodiment, the light source section 10 and the wavelength conversion element constitute a light source device in the appended claims.

As the light source section 10, there can be used the light source device 1 or the light source device 2 described above. The light source device 10 emits, for example, blue light B toward the light collection optical system 80.

The light collection optical system 80 is provided with a first lens 82 and a second lens 84. The light collection optical system 80 is disposed in the light path from the light source section 10 to the wavelength conversion element 90, and collectively makes the blue light B enter a wavelength conversion layer 92 described later in a roughly collected state. The first lens 82 and the second lens 84 are each formed of a convex lens.

The wavelength conversion element 90 is a so-called transmissive wavelength conversion element, and is formed of the single wavelength conversion layer 92 formed in a part of a circular disk 96, which can be rotated by an electric motor 98, continuously along the circumferential direction of the circular disk 96. The wavelength conversion element 90 is configured so as to convert the blue light B into fluorescence including red light R and green light G, and then emit the fluorescence toward the opposite side to the side which the blue light B enters.

The circular disk 96 is made of a material transmitting the blue light B. As the material of the circular disk 96, there can be used, for example, quartz glass, quartz crystal, sapphire, optical glass, and transparent resin.

The blue light B from the light source section 10 enters the wavelength conversion element 90 from the circular disk 96 side.

The wavelength conversion layer 92 is formed on the circular disk 96 via a dichroic film 94 for transmitting the blue light B and reflecting the red light R and the green light G. The dichroic film 94 is formed of, for example, a dielectric multilayer film.

The wavelength conversion layer 92 converts a part of the blue light B having the wavelength of about 445 nm emitted from the light source section 10, and then emits the result, and at the same time, transmits the remaining part of the blue light B without converting the remaining part. As described above, it is possible to obtain the desired colored light using the light source section 10 for emitting the excitation light and the wavelength conversion layer 92. The wavelength conversion layer 92 is formed of a layer including, for example, $(Y, Gd)_3 (Al, Ga)_5 O_{12}$:Ce as a YAG phosphor, and an organic binder.

The collimating optical system 110 is provided with a first lens 112 and a second lens 114 each formed of a convex lens, and roughly collimates the light from the wavelength conversion element 90.

The first lens array 120 has a plurality of first small lenses 122 for dividing the light from the collimating optical system 110 into a plurality of partial light beams. The first lens array 120 has the plurality of first small lenses 122 arranged in a matrix in a plane perpendicular to an illumination light axis 100ax.

The second lens array 130 has a plurality of second small lenses 132 arranged in a matrix in a plane perpendicular to the illumination light axis 100ax. The plurality of second small lenses 132 is disposed corresponding to the plurality of first small lenses 122 of the first lens array 120. The second lens array 130 has a function of imaging the image of each of the first small lenses 122 of the first lens array 120 in the vicinity of the image forming area of each of the liquid crystal light modulation devices 400R, 400G, and 400B in cooperation with the overlapping lens 150.

The polarization conversion element 140 is a polarization conversion element for converting each of the partial beams split into by the first lens array 120 into a substantially unique linearly polarized light beam having a uniform polarization direction, and emitting the resulted partial light beams.

The polarization conversion element 140 has a polarization split layer for transmitting one linearly polarized component out of the polarization components included in the light from the wavelength conversion element 90 without modification while reflecting the other linearly polarized component in a direction perpendicular to the illumination light axis 100ax, a reflecting layer for reflecting the other linearly polarized component, which has been reflected by the polarization split layer, in a direction parallel to the illumination light axis 100ax, and a wave plate for converting the other linearly polarized component having been reflected by the reflecting layer into the one linearly polarized component.

The overlapping lens 150 collects each of the partial light beams from the polarization conversion element 140 to make the partial light beams overlap each other in the vicinity of the image forming area of each of the liquid crystal light modulation devices 400R, 400G, and 400B.

The first lens array 120, the second lens array 130, and the overlapping lens 150 constitute an integrator optical system for homogenizing the in-plane light intensity distribution of the light from the wavelength conversion element 90.

The color separation light guide optical system 200 is provided with dichroic mirrors 210, 220, reflecting mirrors 230, 240, and 250, and relay lenses 260, 270. The color separation light guide optical system 200 has a function of separating the light from the illumination device 100 into the red light R, the green light G, and the blue light B, and then guiding the colored light beams of the red light R, the green light G, and the blue light B to the liquid crystal light modulation devices 400R, 400G, and 400B to be the illumination objects, respectively.

Between the color separation light guide optical system 200 and the liquid crystal light modulation devices 400R, 400G, and 400B, there are disposed field lenses 300R, 300G, and 300B, respectively.

The dichroic mirror 210 transmits the red light R component, and reflects the green light G component and the blue light B component toward the dichroic mirror 220.

The dichroic mirror 220 reflects the green light G component toward the field lens 300G, and transmits the blue light B component.

The red light R having passed through the dichroic mirror 210 is reflected by the reflecting mirror 230, and then enters the image forming area of the liquid crystal light modulation device 400R for the red light R after passing through the field lens 300R.

The green light G having been reflected by the dichroic mirror 210 is further reflected by the dichroic mirror 220, and then enters the image forming area of the liquid crystal light modulation device 400G for the green light G after passing through the field lens 300G.

The blue light B having passed through the dichroic mirror 220 enters the image forming area of the liquid crystal light modulation device 400B for the blue light B via the relay lens 260, the reflecting mirror 240 on the incident side, the relay lens 270, the reflecting mirror 250 on the exit side, and the field lens 300B.

The liquid crystal light modulation devices 400R, 400G, and 400B each modulate the light emitted from the light source section 10 in accordance with image information. These are each for modulating the colored light having entered in accordance with the image information to thereby form a color image, and each become the illumination object of the illumination device 100.

It should be noted that although not shown in the drawings, an incident side polarization plate and an exit side polarization plate are respectively disposed on the light incident side and the light emission side of the liquid crystal light modulation device 400R. The same applies to the liquid crystal light modulation device 400G and the liquid crystal light modulation device 400B.

The cross dichroic prism 500 combines the image light emitted from the respective liquid crystal light modulation devices 400R, 400G, and 400B with each other to form a color image. The cross dichroic prism 500 has a roughly rectangular planar shape composed of four rectangular prisms bonded to each other, and on the roughly X-shaped interfaces on which the rectangular prisms are bonded to each other, there are formed dielectric multilayer films.

The projection optical system 600 projects the color image formed by the liquid crystal light modulation devices 400R, 400G, and 400B on a screen SCR.

The projector 1000 according to the present embodiment is provided with the light source device according to the invention as the light source section 10, and is therefore high in reliability, and is capable of displaying an image with desired brightness. Further, the projector 1000 according to the present embodiment is further provided with the wavelength conversion element 90, and can therefore display an image with a desired color. It should be noted that it is possible to use a phosphor for emitting fluorescence having a color other than yellow as the phosphor. For example, it is also possible to use a phosphor for emitting red fluorescence. It is also possible to use a phosphor for emitting green fluorescence. It is possible to select the wavelength conversion element for emitting the fluorescence having an arbitrary color in accordance with the intended use of the projector.

Although the embodiments of the invention are hereinafter described, each of the constituents and the combinations of the constituents in the embodiments are illustrative only, and modifications such as addition, omission, or substitution of the constituents can be provided within the scope or the spirit of the invention. Further, the embodiments do not limit the scope of the invention.

For example, although in the light source device 1 according to the present embodiment, there is shown an example in which the light transmissive member 43 is disposed on the substrate 11 side of the support frame 41, the light transmissive member 43 can also be disposed on the opposite side of the support frame 41 to the substrate 11. According to this configuration, in the case in which, for example, the housing space S is in the vacuum state, the light transmissive member 43 is hard to be detached from the support frame 41. Therefore, the reliability of the light source device is improved. Further, in the case of this configuration, the formation of the cover 40 can be performed in either of an anterior stage and a posterior stage of the welding process.

Further, although there is shown the example of disposing the member having the lens function on the opposite side of the light transmissive member 43 to the substrate 11, the member having the lens function can also be disposed on the substrate 11 side of the light transmissive member 43.

Further, for example, although there is shown the example in which the projector 1000 according to the present embodiment is provided with the wavelength conversion element 90, it is not required to provide the wavelength conversion element 90. In such a case, as the light source section 10 of the projector, the light source device 1 is used for at least one of the light source section for emitting the red light R, the light source section for emitting the green light G, and the light source section for emitting the blue light B.

Although in the projector 1000 according to the present embodiment, there are used the liquid crystal light modulation devices as the light modulation devices, the light modulation devices are not limited to the liquid crystal light modulation devices. It is also possible to use, for example, a digital mirror device as the light modulation device.

Further, although in the present embodiment, there is shown the example of mounting the light source device according to the invention in the projector, the invention is not limited to the example. The light source device according to the invention can also be applied to lighting equipment, a headlight of a vehicle, and so on.

The entire disclosure of Japanese Patent Application No.: 2016-015565, filed on Jan. 29, 2016 and 2016-213776, filed on Oct. 31, 2016 are expressly incorporated by reference herein.

What is claimed is:

1. A light source device comprising:
   a substrate including metal as a forming material, and having a first surface;
   a plurality of light emitting elements disposed on the first surface side of the substrate;
   a bonding frame disposed on the first surface side of the substrate so as to surround the plurality of light emitting elements; and
   a cover including a light transmissive member disposed so as to be opposed to the first surface of the substrate,
   wherein light emitted from the plurality of light emitting elements is transmitted through the light transmissive member,
   the bonding frame is lower in thermal conductivity compared to the substrate,
   the cover includes the light transmissive member and a support frame to which the light transmissive member is bonded, and
   the support frame is bonded on an opposite side of the bonding frame to the substrate.

2. The light source device according to claim 1, wherein the support frame is welded to the bonding frame.

3. The light source device according to claim 1, wherein the light transmissive member is disposed on the substrate side of the support frame.

4. The light source device according to claim 1, further comprising:
   a housing space surrounded by the substrate, the bonding frame, and the cover,
   wherein the housing space is in a vacuum state.

5. The light source device according to claim 4, wherein the housing space is filled with an inert gas.

6. The light source device according to claim 1, further comprising:
   a housing space surrounded by the substrate, the bonding frame, and the cover,
   wherein the housing space is filled with an inert gas.

7. The light source device according to claim 1, further comprising:
   a wavelength conversion element adapted to convert at least part of the light emitted from the plurality of light emitting elements into fluorescence.

8. A projector comprising:
   the light source device according to claim 1;
   a light modulation device adapted to modulate light emitted from the light source device, in accordance with image information; and
   a projection optical system adapted to project the light modulated by the light modulation device.

9. A light source device comprising:
   a substrate including metal as a forming material, and having a first surface;
   a plurality of light emitting elements disposed on the first surface side of the substrate;
   a bonding frame disposed on the first surface side of the substrate so as to surround the plurality of light emitting elements;
   a cover including a light transmissive member disposed so as to be opposed to the first surface of the substrate; and
   a housing space surrounded by the substrate, the bonding frame, and the cover,
   wherein light emitted from the plurality of light emitting elements is transmitted through the light transmissive member,
   the bonding frame is lower in thermal conductivity compared to the substrate, and
   the housing space is in a vacuum state.

10. The light source device according to claim 9, wherein
    the cover includes the light transmissive member and a support frame to which the light transmissive member is bonded,
    the support frame is bonded on an opposite side of the bonding frame to the substrate, and
    the support frame is welded to the bonding frame.

11. The light source device according to claim 9, wherein
    the cover includes the light transmissive member and a support frame to which the light transmissive member is bonded,
    the support frame is bonded on an opposite side of the bonding frame to the substrate, and
    the light transmissive member is disposed on the substrate side of the support frame.

12. The light source device according to claim 9, further comprising:
    a wavelength conversion element adapted to convert at least part of the light emitted from the plurality of light emitting elements into fluorescence.

13. A projector comprising:
the light source device according to claim 9;
a light modulation device adapted to modulate light emitted from the light source device, in accordance with image information; and
a projection optical system adapted to project the light modulated by the light modulation device.

14. A light source device comprising:
a substrate including metal as a forming material, and having a first surface;
a plurality of light emitting elements disposed on the first surface side of the substrate;
a bonding frame disposed on the first surface side of the substrate so as to surround the plurality of light emitting elements;
a cover including a light transmissive member disposed so as to be opposed to the first surface of the substrate; and
a housing space surrounded by the substrate, the bonding frame, and the cover,
wherein light emitted from the plurality of light emitting elements is transmitted through the light transmissive member,
the bonding frame is lower in thermal conductivity compared to the substrate, and
wherein the housing space is filled with an inert gas.

15. The light source device according to claim 14, wherein
the cover includes the light transmissive member and a support frame to which the light transmissive member is bonded,
the support frame is bonded on an opposite side of the bonding frame to the substrate, and
the support frame is welded to the bonding frame.

16. The light source device according to claim 14, wherein
the cover includes the light transmissive member and a support frame to which the light transmissive member is bonded,
the support frame is bonded on an opposite side of the bonding frame to the substrate, and
the light transmissive member is disposed on the substrate side of the support frame.

17. The light source device according to claim 14, further comprising:
a wavelength conversion element adapted to convert at least part of the light emitted from the plurality of light emitting elements into fluorescence.

18. A projector comprising:
the light source device according to claim 14;
a light modulation device adapted to modulate light emitted from the light source device, in accordance with image information; and
a projection optical system adapted to project the light modulated by the light modulation device.

19. A method of manufacturing a light source device, the method comprising:
providing the light source device including
a substrate including metal as a forming material, and having a first surface,
a plurality of light emitting elements disposed on the first surface side of the substrate,
a bonding frame disposed on the first surface side of the substrate so as to surround the plurality of light emitting elements, and
a cover including a light transmissive member disposed so as to be opposed to the first surface of the substrate; and
bonding the cover to the bonding frame,
wherein the bonding frame is lower in thermal conductivity compared to the substrate,
the cover includes the light transmissive member and a support frame to which the light transmissive member is bonded, and
the cover is bonded to the bonding frame through welding the support frame to the bonding frame.

20. A method of manufacturing a light source device, the method comprising:
providing the light source device including
a substrate including metal as a forming material, and having a first surface,
a plurality of light emitting elements disposed on the first surface side of the substrate,
a bonding frame disposed on the first surface side of the substrate so as to surround the plurality of light emitting elements, and
a cover including a light transmissive member disposed so as to be opposed to the first surface of the substrate; and
bonding the cover to the bonding frame,
wherein the bonding frame is lower in thermal conductivity compared to the substrate,
disposing low-melting point glass between the bonding frame and the light transmissive member, and
melting the low-melting point glass.

* * * * *